United States Patent
Tanabe et al.

(10) Patent No.: US 9,465,211 B2
(45) Date of Patent: Oct. 11, 2016

(54) MICROSCOPE AND GHOSTING ELIMINATION METHOD

(71) Applicant: Sony Corporation, Tokyo (JP)

(72) Inventors: Norihiro Tanabe, Tokyo (JP); Takashi Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/741,651

(22) Filed: Jun. 17, 2015

(65) Prior Publication Data

US 2015/0286052 A1    Oct. 8, 2015

Related U.S. Application Data

(63) Continuation of application No. 13/196,077, filed on Aug. 2, 2011, now abandoned.

(30) Foreign Application Priority Data

Aug. 16, 2010   (JP) .................................. 2010-181760

(51) Int. Cl.
| | |
|---|---|
| *G02B 27/00* | (2006.01) |
| *G02B 21/18* | (2006.01) |
| *G02B 21/24* | (2006.01) |

(52) U.S. Cl.
CPC ........... *G02B 27/0018* (2013.01); *G02B 21/18* (2013.01); *G02B 21/245* (2013.01); *G02B 21/247* (2013.01)

(58) Field of Classification Search
CPC ............ G02B 27/0018; G02B 21/241–21/247
See application file for complete search history.

(56) References Cited

U.S. PATENT DOCUMENTS

| | | |
|---|---|---|
| 5,159,412 A | 10/1992 | Willenborg et al. |
| 5,703,714 A | 12/1997 | Kijima |
| 5,886,813 A | 3/1999 | Nagasawa |

(Continued)

FOREIGN PATENT DOCUMENTS

| | | |
|---|---|---|
| JP | 11-133311 | 5/1999 |
| JP | 2001-091822 | 4/2001 |
| JP | 2004-109863 | 4/2004 |

(Continued)

OTHER PUBLICATIONS

Chinese Office Action issued Sep. 26, 2014 in corresponding Chinese Application No. 201110227638.5.

(Continued)

*Primary Examiner* — Thomas K Pham
*Assistant Examiner* — Cara Rakowski
(74) *Attorney, Agent, or Firm* — K&L Gates LLP (57) ABSTRACT

A microscope includes a first imaging optical system that images sample transmitted light transmitted through a sample provided on a stage, and a second imaging optical system that images a part of the sample transmitted light branched from the first imaging optical system. Here, the second imaging optical system includes a light beam branching element that branches the part of the sample transmitted light from the first imaging optical system, and has a thickness of a predetermined threshold or more, an imaging element that images a phase difference image of the branched sample transmitted light, one or a plurality of optical elements that images an image of the phase difference image of the branched sample transmitted light on the imaging element, and a filter that shields a part of the branched sample transmitted light imaged on the imaging element.

5 Claims, 7 Drawing Sheets

(56) References Cited

U.S. PATENT DOCUMENTS

| | | |
|---|---|---|
| 5,893,653 A | 4/1999 | Abe |
| 5,900,975 A | 5/1999 | Sussman |
| 6,496,309 B1 | 12/2002 | Bliton et al. |
| 7,016,110 B2 | 3/2006 | Leblans |
| 7,426,345 B2 | 9/2008 | Takamatsu et al. |
| 7,679,038 B2 | 3/2010 | Kim et al. |
| 2003/0030912 A1 | 2/2003 | Gleckman et al. |
| 2005/0099622 A1 | 5/2005 | Caracci et al. |
| 2006/0250688 A1 | 11/2006 | Baer |
| 2007/0211460 A1 | 9/2007 | Ravkin |
| 2008/0314878 A1 | 12/2008 | Cai et al. |

FOREIGN PATENT DOCUMENTS

| | | |
|---|---|---|
| JP | 2004-145195 | 5/2004 |
| JP | 2008-268815 | 11/2008 |
| JP | 2009-198903 | 9/2009 |
| JP | 2001-324678 | 11/2011 |

OTHER PUBLICATIONS

Japanese Office Action issued Oct. 14, 2014 in corresponding Japanese Application No. 2010-181760.
Japanese Office Action issued Feb. 12, 2014 in corresponding Japanese Patent Application No. 2010-181760.
European Search Report issued Dec. 6, 2011, for corresponding European Appln. No. 11176550.9.

MICROSCOPE AND GHOSTING ELIMINATION METHOD

CROSS REFERENCES TO RELATED APPLICATIONS

The present application is a continuation application of U.S. patent application Ser. No. 13/196,077, filed Aug. 2, 2011, which application claims priority to Japanese Priority Patent Application JP 2010-181760 filed in the Japan Patent Office on Aug. 16, 2010, the entire contents of which are hereby incorporated by reference.

BACKGROUND

The present application relates to a microscope and a ghosting elimination method.

In the related art, a motor-driven microscope in which a condenser lens, a visual field diaphragm, an aperture diaphragm, the optical axis direction driving mechanism for the objective lens of a sample stage, a filter, a dimming power supply with respect to a light source, and the like are automatically adjusted in accordance with the switching of the objective lens has been disclosed (For example, see Japanese Unexamined Patent Application Publication No. 11-133311).

SUMMARY

However, in order to achieve an autofocus function with respect to the microscope described in Japanese Unexamined Patent Application Publication No. 11-133311, attaching an autofocus device using a phase difference optical system that obtains a defocus position to be observed to the microscope has been considered. In such a case, a light beam branching element is provided on the optical axis of an imaging optical system for imaging, on an imaging element, light transmitted through a sample, so that a part of the light transmitted through the sample is guided to the phase difference optical system.

As a result of intensive studies made by the inventors, with respect to the autofocus device using the phase difference optical system, it was found that ghosting caused by the light beam branching element affects an image that is imaged by the imaging optical system and the phase difference optical system.

The present application is to solve the above problem, and it is desirable to provide a microscope having an autofocus function using a phase difference optical system, and provide a ghosting elimination method in which ghosting caused by a light beam branching element is eliminated with respect to the microscope.

According to an embodiment, there is provided a microscope, including: a first imaging optical system that images sample transmitted light transmitted through a sample provided on a stage; and a second imaging optical system that images a part of the sample transmitted light branched from the first imaging optical system. Here, the second imaging optical system may include a light beam branching element that branches the part of the sample transmitted light from the first imaging optical system, and has a thickness of a predetermined threshold or more, an imaging element that images a phase difference image of the branched sample transmitted light, one or a plurality of optical elements that images an image of the phase difference image of the branched sample transmitted light on the imaging element, and a filter that shields a part of the branched sample transmitted light focused on the imaging element.

The sample transmitted light reflected by the light beam branching element may be imaged in the first imaging optical system, and the phase difference image of the sample transmitted light transmitted through the light beam branching element may be imaged in the second imaging optical system.

The sample transmitted light transmitted through the light beam branching element may be imaged in the first imaging optical system, and the phase difference image of the sample transmitted light reflected by the light beam branching element may be imaged in the second imaging optical system.

The filter may be a diaphragm in which a through hole set for allowing a luminous flux set which becomes the phase difference image to pass therethrough is provided, and the thickness of the light beam branching element may have a larger value than a feature value calculated based on a diameter of the through hole, a center distance between the through holes of the through hole set, and a luminous flux diameter at the position of the filter of the sample transmitted light.

The thickness of the light beam branching element may have a larger value than a feature value calculated based on the following Inequality 1, which is represented as $$t > k \times \frac{(\phi a + \phi b + d)}{2} \quad \text{[Inequality 1]}$$

where t denotes the thickness of the light beam branching element, k denotes a specific constant in an optical system, $\phi a$ denotes a luminous flux diameter at a filter position of the sample transmitted light, $\phi b$ denotes the diameter of the through hole, and d denotes the distance between centers of the through holes of the through hole set.

According to another embodiment, there is provided a ghosting elimination method, including: branching, by a light beam branching element having a thickness of a predetermined threshold or more, a part of sample transmitted light transmitted through a sample provided on a stage; and shielding, by an imaging element for imaging a phase difference image of the branched sample transmitted light and a filter provided between the imaging element and the light beam branching element, ghosting light caused by a corresponding light beam branching element from the part of the sample transmitted light branched by the light beam branching element.

As described above, it is possible to eliminate ghosting caused by a light beam branching element with respect to a microscope having an autofocus function using a phase difference optical system.

Additional features and advantages are described herein, and will be apparent from the following Detailed Description and the figures.

DETAILED DESCRIPTION

Embodiments of the present application will be described below in detail with reference to the drawings.

Further, the description will be made in the following order:

(1) First embodiment
(1-1) Configuration of microscope
(1-2) Light beam branching element
(1-3) configuration of defocus quantity detection unit
(2) Second embodiment
(First embodiment)
<Configuration of Microscope>

Figure 1:
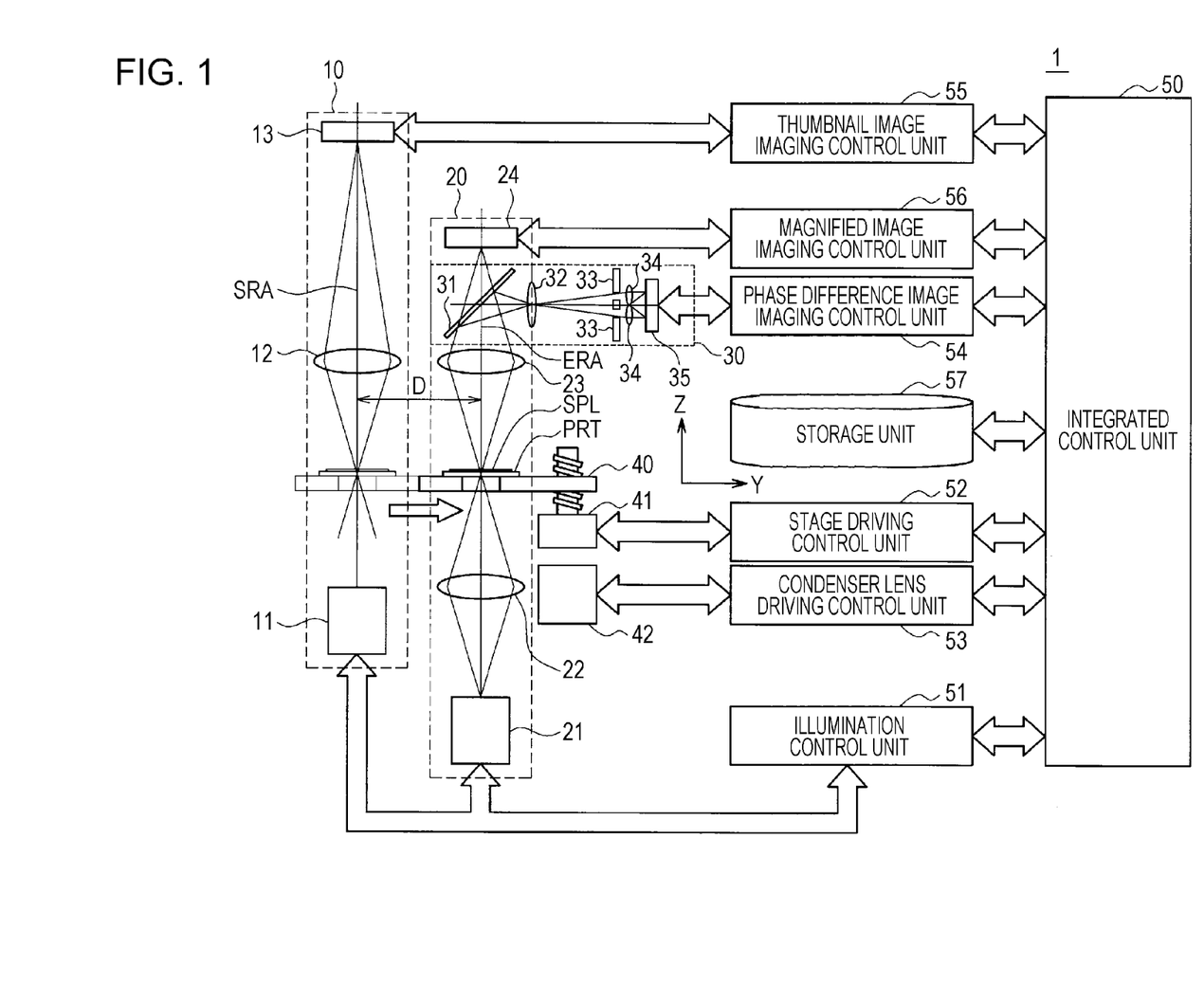
FIG. 1 is a diagram showing a configuration of a microscope according to a first embodiment.

A configuration of a microscope 1 according to a first embodiment will be described with reference to FIG. 1. FIG. 1 is a diagram showing a configuration of a microscope 1 according to the present embodiment.

[Entire Configuration]

As shown in FIG. 1, the microscope 1 according to the present embodiment includes a thumbnail image imaging unit 10 for imaging an image (hereinafter, referred to as "thumbnail image") of the entire preparation PRT in which a biological sample SPL is embedded, and a magnified image imaging unit 20 for imaging an image (hereinafter, referred to as "magnified image") in which the biological sample SPL is magnified at a predetermined magnification ratio. In addition, in the magnified image imaging unit 20, a defocus quantity detection unit 30 for detecting a defocus quantity of an illumination visual field diaphragm existing within the magnified image imaging unit 20 is provided.

The preparation PRT is obtained by fixing, on a slide glass, the biological sample SPL including tissue sections such as connective tissue such as blood, epithelial tissue, or both of these organizations, or smear cells using a predetermined fixing means. The tissue sections or the smear cells are subjected to various types of staining, as necessary. This staining includes general staining represented by HE (Hematoxylin and Eosin) staining, Giemsa staining, and Papanicolaou staining, and fluorescent staining such as FISH (Fluorescence In-Situ Hybridization), an enzyme antibody method, or the like.

In addition, a label in which supplementary information (for example, name of the person who collects sample, collection date, and type of staining, and the like) for specifying a corresponding biological sample SPL is described is attached to the preparation PRT.

In the microscope 1 according to the present embodiment, a stage 40 in which the above described preparation PRT is placed, and a stage driving mechanism 41 for moving the stage 40 in a variety of directions are provided. By the stage driving mechanism 41, the stage 40 is freely moved in a direction (Z-axis direction) perpendicular to a direction (X-axis and Y-axis direction) parallel to a stage surface.

In addition, in the magnified image imaging unit 20, a condenser lens driving mechanism 42 as an example of a focus adjustment unit for an illumination visual field diaphragm is provided.

<Thumbnail Image Imaging Unit>

As shown in FIG. 1, the thumbnail image imaging unit 10 mainly includes a light source 11, an objective lens 12, and an imaging element 13.

The light source 11 is provided on a surface opposite to a surface on which the preparation of the stage 40 is disposed. The light source 11 may perform irradiation by switching light (hereinafter, referred to as bright visual field illumination light, or simply referred to illumination light) for illuminating the biological sample SPL having been subjected to the general staining, and light (hereinafter, referred to as dark visual field illumination light) for illuminating the biological sample SPL having been subjected to special staining. In addition, the light source 11 may perform irradiation with respect to only one of the bright visual field illumination light and the dark visual field illumination light. In this case, as the light source 11, two types of light sources such as a light source for irradiating the bright visual field illumination light and a light source for irradiating the dark visual field illumination light are provided.

In addition, in the thumbnail image imaging unit 10, a label light source (not shown) that irradiates light for imaging the supplementary information described on the label attached to the preparation PRT may not be separately provided.

The objective lens 12 with a predetermined magnification is arranged on the preparation disposition surface side of the stage 40 using, as the optical axis SRA, a normal line of a reference position of the thumbnail image imaging unit 10 in the preparation disposition surface. Transmitted light transmitted through the preparation PRT arranged on the stage 40 is condensed by the objective lens 12, and is imaged on the imaging element 13 provided behind (that is, advancing direction of the illumination light) the objective lens 12.

On the imaging element 13, light (in other words, transmitted light transmitted through the entire preparation PRT) of an imaging range including the entire preparation PRT placed in the preparation disposition surface of the stage 40 is imaged. An image imaged on the imaging element 13 is a thumbnail image being a microscope image obtained by imaging the entire preparation PRT.

<Magnified Image Imaging Unit>

As shown in FIG. 1, the magnified image imaging unit 20 mainly includes a light source 21, a condenser lens 22, an objective lens 23, and an imaging element 24. In addition, an illumination visual field diaphragm (not shown) is provided in the magnified image imaging unit 20.

The light source 21 irradiates bright visual field illumination light, and is provided on a surface opposite to a surface on which the preparation of the stage 40 is disposed. In addition, a light source (not shown) that irradiates dark visual field illumination light is provided in different position (for example, preparation disposition surface side) from that of the light source 21.

The condenser lens 22 is a lens that condenses the bright visual field illumination light irradiated from the light source 21 or the dark visual field illumination light irradiated from a light source for dark visual field illumination, and guides the condensed light to the preparation PRT on the stage 40. The condenser lens 22 is arranged between the light source 21 and the stage 40 using, as the optical axis ERA, a normal line of a reference position of the magnified image imaging unit 20 in the preparation disposition surface. In addition, the condenser lens driving mechanism 42 may drive the condenser lens 22 in a direction of the optical axis ERA. The condenser lens 22 may change the position on the optical axis ERA by the condenser lens driving mechanism 42.

The objective lens 23 of the predetermined magnification is arranged in the preparation disposition surface side of the stage 40 using, as the optical axis ERA, the normal line of the reference position of the magnified image imaging unit 20 in the preparation disposition surface. In the magnified image imaging unit 20, the biological sample SPL is magnified at a variety of magnification ratios by appropriately changing the objective lens 23, and the magnified sample is imaged. The transmitted light transmitted through the preparation PRT arranged on the stage 40 is condensed by the objective lens 23, and is imaged on the imaging element 24 provided behind (that is, advancing direction of illumination light) the objective lens 23.

In addition, on the optical axis ERA between the objective lens 23 as an example of a first imaging optical system, and the imaging element 24, a light beam branching element 31 is provided, and a part of the transmitted light transmitted through the objective lens 23 is guided to a defocus quantity detection unit 30, which will be described later.

In the imaging element 24, an image of an imaging range having a predetermined width and height is imaged on the preparation disposition surface of the stage 40 depending on a pixel size of the imaging element 24 and a magnification ratio of the objective lens 23. In addition, since a part of the biological sample SPL is magnified by the objective lens 23, the above described imaging range is a satisfactorily narrow range, compared with the imaging range of the imaging element 13.

Here, as shown in FIG. 1, the thumbnail image imaging unit 10 and the magnified image imaging unit 20 are arranged in such a manner that the optical axes SRA and ERA of the normal line of the reference position of each of the thumbnail image imaging unit 10 and the magnified image imaging unit 20 are separated from each other by a distance D in a Y-axis direction. The distance D is set to a short distance for miniaturization while a lens barrel (not shown) holding the objective lens 23 of the magnified image imaging unit 20 does not appear in the imaging range of the imaging element 13.

<Defocus Quantity Detection Unit>

The defocus quantity detection unit 30 as an example of a second imaging optical system mainly includes a light beam branching element 31, a condenser lens 32, a two eye lens filter 33, a two eye lens 34, and an imaging element 35, as shown in FIG. 1.

As described above, the light beam branching element 31 is provided on the optical axis ERA between the objective lens 23 of the magnified image imaging unit 20 and the imaging element 24, so that a part of sample transmitted light (light transmitted through the sample) transmitted through the objective lens 23 is reflected. In other words, by the light beam branching element 31, the sample transmitted light transmitted through the objective lens 23 is branched to transmitted light advancing toward the imaging element 24 and reflected light advancing toward the condenser lens 32 within the defocus quantity detection unit 30, which will be described later.

According to the present embodiment, in an advancing direction side of the reflected light branched by the light beam branching element 31, the condenser lens 32 is provided. The condenser lens 32 condenses the reflected light branched by the light beam branching element 31, and guides the condensed light to the two eye lens 34 provided behind (advancing direction side of reflected light) the condenser lens 32.

The two eye lens filter 33 is a filter that is provided between the condenser lens 32 and the two eye lens 34, which will be described later, and shields a part of the reflected light (reflected light of sample transmitted light) imaged on the imaging element 35 provided within the defocus quantity detection unit 30. The reflected light transmitted through the two eye filter 33 is guided to the two eye lens 34 provided behind the two eye lens filter 33.

The two eye lens 34 splits a luminous flux introduced by the condenser lens 32 into two luminous fluxes. The split luminous flux forms a set of object images on a imaging surface of the imaging element 35 provided behind (advancing direction side of reflected light) the two eye lens 34.

On the imaging element 35, each of light transmitted through the two eye lens 34 is imaged. As a result, on an imaging surface of the imaging element 35, the set of object images is formed. Since luminous fluxes of a variety of directions emitted from the condenser lens 32 are made incident on the two eye lens 34, a phase difference exists between the formed set of object images. Hereinafter, the set of object images is referred to as a phase difference image. The defocus quantity detection unit 30 according to the present embodiment detects a defocus quantity of an illumination visual field diaphragm existing within the magnified image imaging unit 20, using the phase difference.

Further, in the described above, a configuration in which the condenser lens as a phase difference AF optical system within the defocus quantity detection unit 30, the two eye lens filter, the two eye lens, and the imaging element are provided is shown, however, the configuration is not limited to the example. Another optical system may be used as long as the other optical system can realize the same function as that of the phase difference AF optical system, such as using a field lens and a separator lens instead of the condenser lens and the two eye lens.

In addition, the imaging elements which are provided on the thumbnail image imaging unit 10, the magnified image imaging unit 20 and the defocus quantity detection unit 30 respectively, may be an one dimensional imaging element or a two dimensional element.

Further, the defocus quantity detection unit 30 will be described in detail below again.

<Control Unit>

As shown in FIG. 1, a control unit for controlling various positions of the microscope is connected to the microscope 1 according to the present embodiment. Specifically, an illumination control unit 51 for controlling a variety of light sources of the microscope 1 which includes a light source 11 and a light source 21 is connected to the microscope 1 according to the present embodiment, and a stage driving control unit 52 for controlling the stage driving mechanism 41 is connected to the stage driving mechanism 41. In addition, a condenser lens driving control unit 53 for performing position control of the condenser lens 22 is connected to the condenser lens 22. Further, a phase difference image imaging control unit 54 is connected to the imaging element 35 for imaging the phase difference image, and a thumbnail image imaging control unit 55 is connected to the imaging element 13 for imaging a thumbnail image. In addition, a magnified image imaging control unit 56 is connected to the imaging element 24 for imaging a magnified image of the biological sample SPL. These control units are connected with respect to a position for performing control via a variety of data communication channels.

In addition, in the microscope 1 according to the present embodiment, a control unit (hereinafter, referred to as integrated control unit 50) for controlling the entire microscope is separately provided, and connected to the above described control units via the variety of data communication channels.

The above described control unit is realized by CPU (Central Processing Unit), GPU (Graphics Processing Unit), ROM (Read Only Memory), RAM (Random Access Memory), a storage device, a communication device, an arithmetic circuit, and the like.

Hereinafter, function of the above described control unit will be briefly described.

<Illumination Control Unit>

An illumination control unit 51 is a processing unit for controlling a variety of light sources of the microscope 1 according to the present embodiment. The illumination control unit 51 performs irradiation control of a corresponding light source based on information indicating an acquired illumination method when information indicating an illumination method of the biological sample SPL is output from the integrated control unit 50.

For example, a case in which the illumination control unit 51 controls the light source 11 provided in the thumbnail image imaging unit 10 will be herein noted. In such a case, with reference to information indicating the illumination method, the illumination control unit 51 determines which one of a mode (hereinafter, referred to as bright visual field mode) which is necessary for acquiring a bright visual field image, and a mode (hereinafter, referred to as dark visual field mode) which is necessary for acquiring a dark visual field image is performed. Thereafter, the illumination control unit 51 sets parameters depending on each mode with respect to the light source 11, and irradiates illumination light applied to each mode from the light source 11. Thus, the illumination light irradiated from the light source 11 is irradiated to the entire biological sample SPL via an opening of the stage 40. Further, as examples of the parameters set by the illumination control unit 51, intensity of the illumination light, selection in type of the light source, and the like may be given.

In addition, a case in which the illumination control unit 51 controls the light source 21 provided in the magnified image imaging unit 20 will be herein noted. In such a case, with reference to information indicating the illumination method, the illumination control unit 51 determines which one of the bright visual field mode and the dark visual field mode is performed. Thereafter, the illumination control unit 51 sets parameters depending on each mode with respect to the light source 21, and irradiates illumination light applied to each mode from the light source 21. Thus, the illumination light irradiated from the light source 21 is irradiated to the entire biological sample SPL via the opening of the stage 40. Further, as examples of the parameters set by the illumination control unit 51, intensity of the illumination light, selection in the type of the light source, and the like may be given.

Further, as irradiation light in the bright visual field mode, visible light may be used. In addition, as irradiation light in the dark visual field mode, light including a wavelength which can excite a fluorescent marker used in the special staining may be used. In addition, in the dark visual field mode, a background portion with respect to the fluorescent marker is cut out.

<Stage Driving Control Unit>

The stage driving control unit 52 is a processing unit that controls the stage driving mechanism 41 for driving the stage provided in the microscope 1 according to the present embodiment. The stage driving control unit 52 controls the stage driving mechanism 41 based on information indicating an acquired imaging method when information indicating an imaging method of the biological sample SPL is output from the integrated control unit 50.

For example, a case in which a thumbnail image is imaged by the microscope 1 according to the present embodiment will be noted herein. When information indicating that the thumbnail image of the biological sample SPL is imaged is output from the integrated control unit 50, the stage driving control unit 52 moves the stage 40 in a stage surface direction (X-Y axis direction) so that the entire preparation PRT is within the imaging range of the imaging element 13. In addition, the stage driving control unit 52 moves the stage 40 in a Z-axis direction so that focal point of the objective lens 12 matches the entire preparation PRT.

In addition, a case in which a magnified image is imaged by the microscope 1 according to the present embodiment will be herein noted. When information indicating that the magnified image of the biological sample SPL is imaged is output from the integrated control unit 50, the stage driving control unit 52 drives and controls the stage driving mechanism 41, and moves the stage 40 in the stage surface direction so that the biological sample SPL is positioned between the light source 11 and the objective lens 12 and between the condenser lens 22 and the objective lens 23.

In addition, the stage driving control unit 52 moves the stage 40 in the stage surface direction (X-Y axis direction) so that a predetermined portion of the biological sample is positioned in the imaging range imaged by the imaging element 24.

Further, the stage driving control unit 52 moves the stage 40 in a direction (Z-axis direction, and depth direction of tissue sections) perpendicular to the stage surface so that the position of the biological sample SPL positioned within a predetermined shooting range matches the focal point of the objective lens 23 by driving and controlling the stage driving mechanism 41.

<Condenser Lens Driving Control Unit>

The condenser lens driving control unit 53 is a processing unit that controls the condenser lens driving mechanism 42 for driving the condenser lens 22 provided in the magnified image imaging unit 20 of the microscope 1 according to the present embodiment. When information relating to the defocus quantity of the illumination visual field diaphragm is output from the integrated control unit 50, the condenser lens driving control unit 53 controls the condenser lens driving mechanism 42 based on acquired information relating to the defocus quantity.

As described below, when the illumination visual field diaphragm provided within the magnified image imaging unit 20 is not properly imaged, a generated contrast of the magnified image is degraded. In order to prevent the degradation of the contrast, in integrated control unit 50 which will be described later, a specification processing is performed with respect to the defocus quantity of the illumination visual field diaphragm based on a phase difference image generated by the defocus quantity detection unit 30, in the microscope 1 according to the present embodiment. The integrated control unit 50 outputs information indicating the specified defocus quantity of the illumination visual field diaphragm to the condenser lens driving control unit 53, and changes the position of the condenser lens 22 so that the illumination visual field diaphragm is imaged.

So that the illumination visual field diaphragm is imaged by performing driving control of the condenser lens driving mechanism 42, the condenser lens driving control unit 53 corrects the position (position on the optical axis ERA) of the condenser lens 22.

<Phase Difference Image Imaging Control Unit>

The phase difference image imaging control unit 54 is a processing unit that controls the imaging element 35 provided in the defocus quantity detection unit 30. The phase difference image imaging control unit 54 sets parameters according to the bright visual field mode or the dark visual field mode in the imaging element 35. In addition, when acquiring output signals, which are output from the imaging element 35, equivalent to an image imaged on the imaging surface of the imaging element 35, the phase difference image imaging control unit 54 uses the acquired output signals as output signals equivalent to the phase difference image. When acquiring the output signals equivalent to the phase difference image, the phase difference image imaging control unit 54 outputs data equivalent to the acquired signals to the integrated control unit 50. Further, as examples of the parameters set by the phase difference image imaging control unit 54, a start timing and a termination timing of exposure (in other words, exposure time), and the like may be given.

<Thumbnail Image Imaging Control Unit>

The thumbnail image imaging control unit 55 is a processing unit that controls the imaging element 13 provided in the thumbnail image imaging unit 10. The thumbnail image imaging control unit 55 sets parameters according to the bright visual field mode or the dark visual field mode in the imaging element 13. In addition, when acquiring output signals corresponding to an image imaged on the imaging surface of the imaging element 13 which is output from the imaging element 13, the thumbnail image imaging control unit 55 uses the acquired output signals as output signals corresponding to the thumbnail image. When acquiring the output signals corresponding to the thumbnail image, the thumbnail image imaging control unit 55 outputs data corresponding to the acquired signals to the integrated control unit 50. Further, as examples of the parameters set by the thumbnail image imaging control unit 55, a start timing and a termination timing of exposure (in other words, exposure time), and the like may be given.

<Magnified Image Imaging Control Unit>

The magnified image imaging control unit 56 is a processing unit that controls the imaging element 24 provided in the magnified image imaging unit 20. The magnified image imaging control unit 56 sets parameters according to the bright visual field mode or the dark visual field mode in the imaging element 24. In addition, when acquiring output signals corresponding to an image imaged on the imaging surface of the imaging element 24 which is output from the imaging element 24, the magnified image imaging control unit 56 uses the acquired output signals as output signals corresponding to a magnified image. When acquiring the output signals corresponding to the magnified image, the magnified image imaging control unit 56 outputs data corresponding to the acquired signals to the integrated control unit 50. Further, as examples of the parameters set by the magnified image imaging control unit 56, a start timing and a termination timing of exposure (in other words, exposure time), and the like may be given.

The storage unit 57 is an example of a storage device included in the microscope 1 according to the present embodiment. In the storage unit 57, various setting information for controlling the microscope 1 according to the present embodiment, various databases, or a look-up table, or the like is stored. In addition, in the storage unit 57, a variety of historical information such as an imaging history of the sample in the microscope 1 may be recorded. Further, in the storage unit 57, various parameters have to be saved when performing certain processing by the microscope 1 (particularly, integrated control unit 50) according to the present embodiment, a progress of the process, various databases or programs, and the like are appropriately recorded.

In the storage unit 57, it is possible for the respective processing units included in the microscope 1 to freely perform reading and writing.

<Integrated Control Unit>

The integrated control unit 50 is a processing unit that controls the entire microscope including the above described various control units.

The integrated control unit 50 acquires data relating to the phase difference image imaged by the microscope 1, and calculates a defocus quantity of the illumination visual field diaphragm and the amount of change in the thickness of a slide glass, based on the phase difference image data. The integrated control unit 50 executes imaging of the optical system present within the magnified image imaging unit 20 of the microscope 1 using the defocus quantity and the amount of change in the thickness of the slide glass, so that it is possible to further improve imaging precision of the obtained magnified image.

In addition, the integrated control unit 50 acquires, from the microscope 1, microscope image data relating to the thumbnail image and the magnified image which are imaged by the microscope 1, and develops this data, or executes a predetermined digital processing. Thereafter, the integrated control unit 50 uploads the microscope image data obtained from the thumbnail image and the magnified image to an image management server via a network such as the Internet, a dedicated line, and the like. Thus, the microscope image of the sample imaged by the microscope 1 is able to be browsed by a client device connected to the network.

Figure 2:
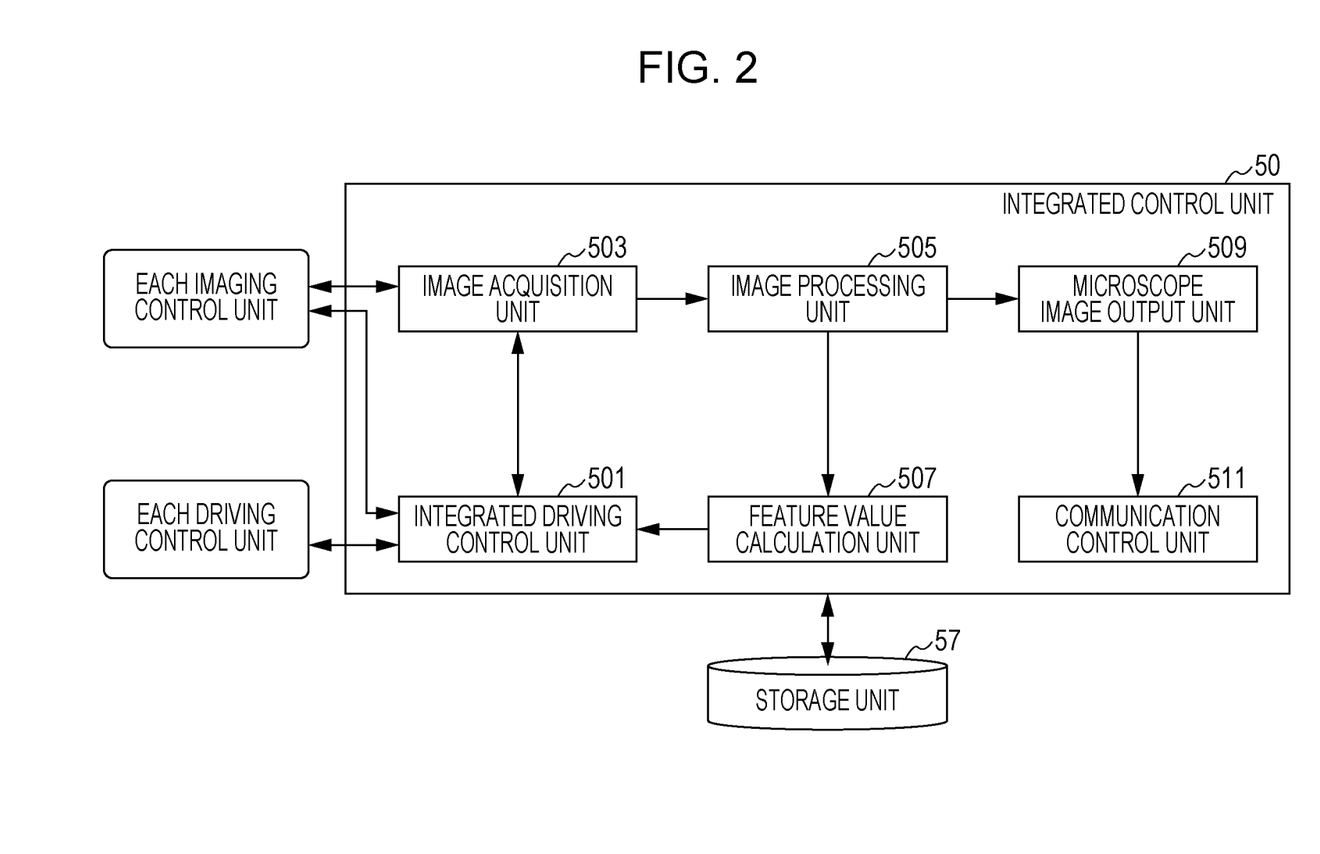
FIG. 2 is a block diagram showing a configuration of an integration control unit according to a first embodiment.

Hereinafter, with reference to FIG. 2, a configuration of the integrated control unit 50 according to the present embodiment will be described in detail. FIG. 2 is a block diagram showing a configuration of the integrated control unit 50 according to the present embodiment.

As shown in FIG. 2, the integrated control unit 50 according to the present embodiment mainly includes an integrated driving control unit 501, an image acquisition unit 503, an image processing unit 505, a feature value calculation unit 507, a microscope image output unit 509, and a communication control unit 511.

The integrated driving control unit 501 is realized by, for example, CPU, ROM, RAM, or the like. The integrated driving control unit 501 is a driving control unit that integrally controls the control unit (the illumination control unit 51, the stage driving control unit 52, the condenser lens driving control unit 53, and the phase difference image imaging control unit 54, the thumbnail image imaging control unit 55, and the magnified image imaging control unit 56) for controlling each part of the microscope 1. The integrated driving control unit 501 sets a variety of information (for example, various setting parameters, and the like) with respect to each part of the microscope 1, or acquires a variety of information from each part of the microscope 1. The integrated driving control unit 501 may output the variety of information acquired from each part of the microscope 1 to the feature value calculation unit 507, which will be described later.

The image acquisition unit 503 is realized by, for example, CPU, ROM, RAM, a communication device, or the like. The image acquisition unit 503 acquires data corresponding to the thumbnail image imaged by the thumbnail image imaging unit 10, data corresponding to the magnified image imaged by the magnified image imaging unit 20, and data corresponding to the phase difference image imaged by the defocus quantity detection unit 30 through each imaging control unit.

When acquiring the image data through each imaging control unit, the image acquisition unit 503 outputs the acquired image data to the image control unit 225, which will be described later.

Further, the image acquisition unit 503 may associate the acquired image data (the microscope image data) with information concerning an acquisition date, and the like, and store the associated information in the storage unit 57, and the like.

The image processing unit 505 is realized by, for example, CPU, GPU, ROM, RAM, and the like. The image processing unit 505 executes a predetermined image process on the microscope image output from the image acquisition unit 503.

Specifically, when acquiring the phase difference image data, the thumbnail image data, and the magnified image data (more specifically, RAW data of these images) which are output from the image acquisition unit 503, the image processing unit 505 performs a developing process of the RAW data. In addition, the image processing unit 505 executes a process (stitching process) in which a plurality of images constituting these images is connected together, while performing the developing process of the image data.

In addition, the image processing unit 505 is able to execute a conversion process (transcoding) of acquired digital image data, if necessary. As the conversion process of the digital image, a process in which the digital image is compressed to generate a JPEG image, or a process in which the data compressed into the JPEG image is converted into a compressed image of a different type (for example, GIF format, and the like) may be given. In addition, in the conversion process of the digital image, a re-compressing process in which the compressed image data is decompressed once, and then is subjected to a process such as edge enhancement, and the like, or a process of changing the compression ratio of the compressed image may be included.

When the above described image process is executed with respect to the phase difference image data, the image processing unit 505 outputs the phase difference image data obtained after executing the image process to the feature value calculation unit 507, which will be described later. In addition, when the above described image process is executed with respect to the thumbnail image data and the magnified image data, the image processing unit 505 outputs the microscope image obtained from these images and various metadata representing the microscope image to the microscope image output unit 509, which will be described later.

The feature value calculation unit 507 is realized by, for example, CPU, GPU, ROM, RAM, or the like. The feature value calculation unit 507 acquires data concerning the phase difference image imaged by the microscope 1, and calculates a defocus quantity of the sample placed in the stage of the microscope 1 based on the phase difference image data. In addition, the feature value calculation unit 507 is able to calculate the defocus quantity of the illumination visual field diaphragm, and the amount of change in the thickness of the slide glass based on the phase difference image data. The integrated control unit 50 executes imaging of the optical system present within the magnified image imaging unit 20 of the microscope 1 using the defocus quantity and the amount of change in the thickness of the slide glass, so that it is possible to further improve imaging precision of the obtained magnified image.

Various feature values described above that are calculated by the feature value calculation unit 507 are output to the integrated driving control unit 501.

The microscope image output unit 509 is realized by, for example, CPU, ROM, RAM, or the like. The microscope image output unit 509 outputs, to the image management server through the communication control unit 511 which will be described later, a variety of information such as the microscope image output from the image processing unit 505, metadata associated with the microscope image, and the like. Thus, the microscope image (digital microscope image) of the sample imaged by the microscope 1 is managed by the image management server.

The communication control unit 511 is realized by, for example, CPU, ROM, RAM, a communication device, or the like. The communication control unit 511 performs control of the communication performed through a network such as the Internet, a dedicated line, and the like between the integrated control unit 50 and the image management server provided externally to microscope 1.

As above, an example of the functions of the integrated control unit 50 according to the present embodiment has been shown. The above described components may be configured using members or circuits for general purpose, or configured by hardware specialized for the function of each of the components. In addition, the functions of each of the components are entirely performed by CPU, and the like. Accordingly, depending on levels of technologies when the present embodiment is executed, it is possible to appropriately change the configuration to be used.

Further, it is possible to prepare a computer program for realizing each function of the integrated control unit according to the present embodiment or of other control units, and to implement the prepared computer program in a personal computer, and the like. In addition, it is possible to provide a computer-readable recording medium in which the above described computer program is stored. The recording medium is, for example, a magnetic disk, an optical disc, a magneto-optical disc, a flash memory, and the like. In addition, the computer program may be delivered over, for example, the network without using the recording medium.

As above, the entire configuration of the microscope 1 according to the present embodiment has been described in detail with reference to FIGS. 1 to 2.

<Light Beam Branching Element>

Figure 3:
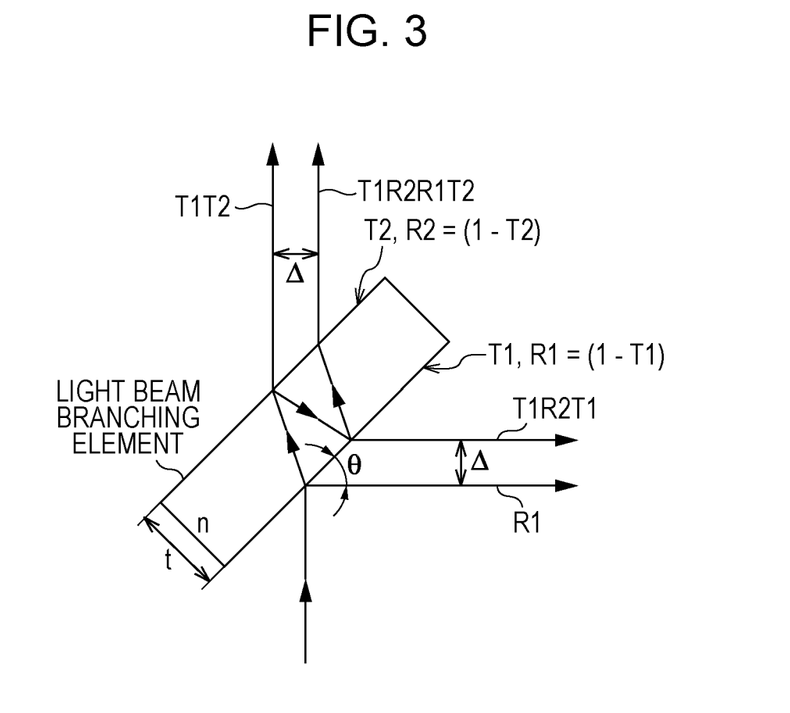
FIG. 3 is a diagram showing a light beam branching element.

Next, before describing the defocus quantity detection unit 30 according to the present embodiment in detail, studies for the light beam branching element conducted by the present inventors will be described in detail with reference to FIG. 3. FIG. 3 is a diagram showing the light beam branching element.

As shown in FIG. 3, light made incident on the light beam branching element is branched to reflected light R1 reflected from a front surface of the light beam branching element, and transmitted light T1T2 transmitted through the front surface and the rear surface of the light beam branching element. However, the light made incident on the light beam branching element is multiplex-reflected within the light beam branching element to thereby become reflected light called ghosting light or transmitted light, other than the reflected light R1 and the transmitted light T1T2.

For example, the light made incident on the light beam branching element is reflected from the rear surface of the light beam branching element, and further escaped from the front surface of the light beam branching element (light beam shown in T1R2T1 of FIG. 3) to thereby become ghosting light of the reflected light R1. Similarly, the light made incident on the light beam branching element is reflected from the rear surface and the front surface of the light beam branching element, and escaped from the rear surface of the light beam branching element (light beam shown in T1R2R1T2 of FIG. 3) to thereby become ghosting light of the transmitted light T1T2. The reflected light or the transmitted light and the ghosting light corresponding to this light are separated from each other by an interval Δ as shown in FIG. 3, and image blurring or the like is caused by the ghosting light.

The separation distance Δ between the transmitted light or the reflected light and the ghosting light is changed depending on a thickness t of the light beam branching element, and when a reflective index n of the light beam branching element is uniform, Δ is reduced along with a reduction in the thickness t. Due to this, in the related art, it is possible to match the ghosting light with the transmitted light or the reflected light as much as possible by reducing the thickness t.

In addition, as described above, since the ghosting light is generated by reflection within the light beam branching element, the light beam branching element is subjected to an AR coating, and the like in the related art, and thereby generation of the ghosting light in the transmitted side or the reflected side is suppressed.

Here, as is apparent from FIG. 1, in the microscope 1 according to the present embodiment, both the transmitted light and the reflected light of the light beam branching element are used in various processes performed within the microscope 1, so that it is necessary that generation of the ghosting light in both the transmitted side and the reflected side is suppressed.

However, even though the coating is executed on the light beam branching element, it is difficult for the generation of the ghosting light in both the transmitted side and the reflected side to be suppressed. In addition, studies for using a pellicle mirror as the light beam branching element have been conducted by the present inventors, however, it was found that there are problems such as temperature characteristics, disturbance of wave front due to deflection of the mirror itself, and the like.

Therefore, the present inventors have conducted extensive studies for a method of capable of removing ghosting due to the light beam branching element using luminous fluxes of both of the transmitted side and the reflected side in the microscope including a phase difference autofocus optical system. As a result, as described below, the microscope 1 according to the present embodiment is obtained.

<Configuration of Defocus Quantity Detection Unit>

Hereinafter, a phase difference autofocus (AF) optical system (hereinafter, simply referred to as phase difference optical system) included in the defocus quantity detection unit 30 according to the present embodiment will be described in detail with reference to FIGS. 4 to 7.

Figure 4:
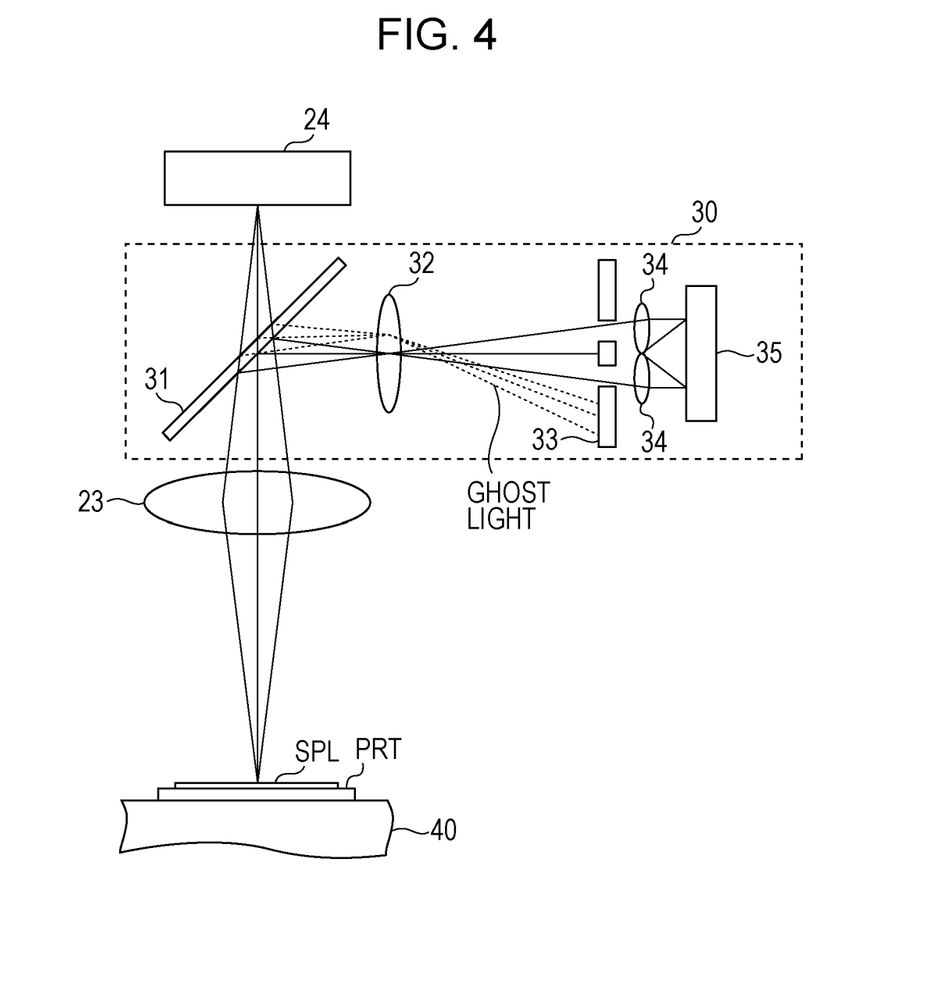
FIG. 4 is a diagram showing an example of a defocus quantity detection unit according to a first embodiment.

As shown in FIG. 4, the phase difference optical system included in the defocus quantity detection unit 30 according to the present embodiment includes a light beam branching element 31 for branching a part of light (sample transmitted light) transmitted through a sample SPL, a condenser lens 32 for condensing the sample transmitted light branched by the light beam branching element 31, a two eye lens filter 33, a two eye lens 34, and an imaging element 35.

Here, the light beam branching element 31 according to the present embodiment is provided within an imaging optical system that includes the condenser lens 23 for condensing the light (sample transmitted light) transmitted through the sample SPL, and the imaging element 24 on which the sample transmitted light condensed by the condenser lens 23 is imaged. In addition, since the light beam branching element 31 according to the present embodiment eliminates the above described ghosting light, the light beam branching element 31 has a thickness more than a predetermined threshold value.

As described above, a separation distance Δ between the transmitted light or the reflected light and the ghosting light is proportional to the thickness t of the light beam branching element. Thus, in order to separate the ghosting light from the transmitted light and the reflected light used in the microscope 1 as much as possible, a thickness of the light beam branching element 31 is to be thicker than that of the light beam branching element in the related art. The light beam branching element 31 has a thickness more than a predetermined threshold value, so that the ghosting light generated in the light beam branching element 31 is separated significantly from the sample transmitted light (surface reflected light) reflected by the light beam branching element 31. As a result, it is possible to shield the ghosting light separated significantly from the surface reflected light by the two eye lens filter 33, which will be described later, so that it is possible to prevent the ghosting light from being imaged on the imaging element 35.

Figure 5:
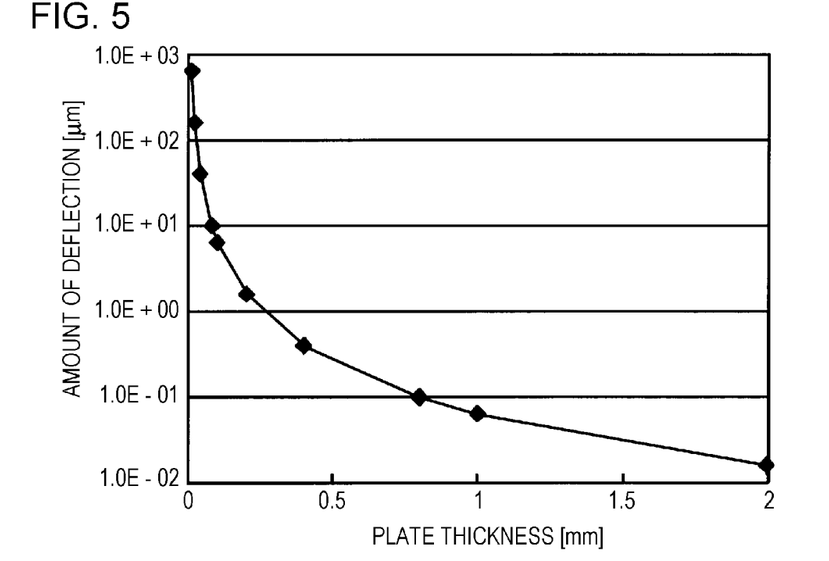
FIG. 5 is a graph showing a relationship between a thickness of a light beam branching element and an amount of deflection.

Here, by increasing the thickness of the light beam branching element 31, an amount of deflection of the light beam branching element is changed. FIG. 5 is a graph showing a result in which a flat plate using BK7 as a glass material is fixed in such a manner that free ends of the flat plate are fixed, and the amount of deflection of the glass material is measured. As is apparent from FIG. 5, it is found that the amount of deflection generated in the glass material is rapidly increased along with a reduction in the thickness of the glass material. In addition, in FIG. 5, the case of using the BK7 as the glass material is shown, however, a behavior such that the amount of deflection is increased along with the reduction in the thickness is common even using other glass materials.

In the case of manufacturing the light beam branching element using the glass material, the reflected surface of the light beam branching element functions as a curvature reflection mirror different from an original plane reflection mirror due to the deflection of the light beam branching element. Therefore, such as the light beam branching element 31 according to the present embodiment, the thickness of the light beam branching element is increased reversely to the related art, so that it is possible to achieve separation of the ghosting light, and to prevent the deflection of the light beam branching element. Here, to prevent effect due to the above described deflection, in the light beam branching element 31 according to the present embodiment, a plate thickness of the light beam branching element 31 is preferably increased so that the deflection is negligible.

Further, the glass material used when manufacturing the light beam branching element is preferably selected in consideration of temperature characteristics of the glass material, and the like. For example, since change in the plate thickness of the light beam branching element due to thermal expansion is proportional to a thermal expansion coefficient of the glass material, synthetic quartz having the thermal expansion coefficient of about 8% is used in comparison with the thermal expansion coefficient of the BK7, and the like, so that it is possible to suppress effects relating to the thermal expansion, and to further suppress effects caused by the change in the thickness.

In addition, as described above, the light beam branched by the light beam branching element 31 is used to acquire focus information (defocus information) by the defocus quantity detection unit 30 (phase difference optical system). Thus, so that even a defocused light beam is able to be detected, the light beam branching element 31 preferably has a plane size which does not have light beam vignetting in a desired defocus range.

As described above, in the microscope 1 according to the present embodiment, the ghosting light is shielded by the two eye lens filter provided within the phase difference optical system, so that it is preferable that a desired amount of light is guided to the phase difference optical system, and then effects of the ghosting light generated in the imaging element 24 of the imaging optical system (magnified image imaging unit 20) are made small to a minimum.

For example, in a case in which the imaging element 24 provided in the imaging optical system is an imaging element with 12 bit gradation, it is preferable that the ratio SNR of the imaging element 24 to an amount of the ghosting light is at least $20 \log(2^{12}/1) = 72.24$ dB.

In addition, it is assumed that the front surface reflectance and transmittance of the light beam branching element are R1 and T1, respectively, and the rear surface reflectance and transmittance are R2 and T2. In this case, the ratio of the reflected side to the amount of the ghosting light is represented as $20 \log(R1/(T1R2T1))$, and the ratio of the transmitted side to the amount of the ghosting light is represented as $20 \log(1/(R1R2))$.

Figure 6:
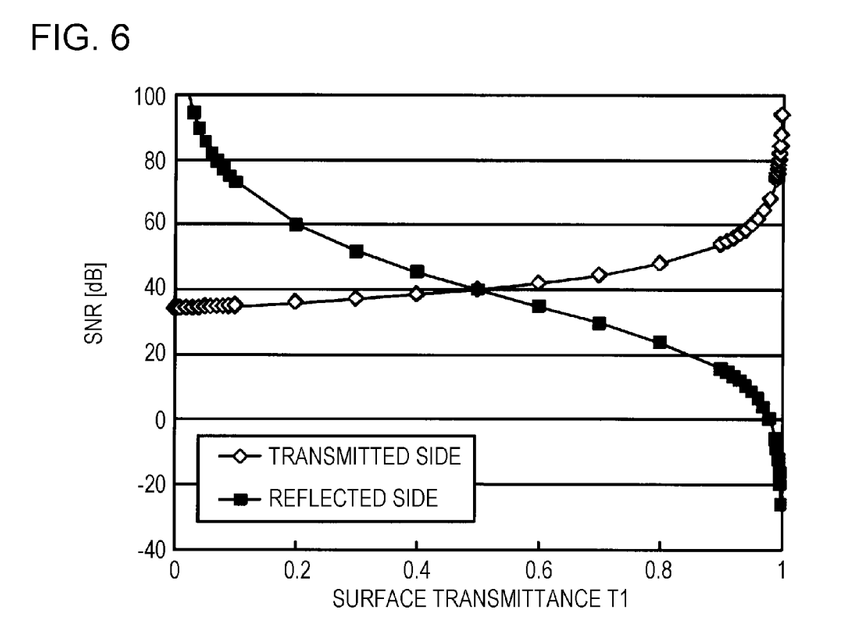
FIG. 6 is a graph showing a relationship between a surface transmittance of a light beam breaching element and an SN ratio of ghosting.

Thus, for example, an AR (Anti-Reflective) coating is performed on a rear surface, and the amount of the ghosting light in a case in which T2=0.98 and R2=0.02 is calculated to be shown in FIG. 6. In FIG. 6, so that effect of the ghosting light is approximately the noise level of the imaging element 24 in the imaging element 24, it is preferable to satisfy T1>0.988 and R1<0.012 when the imaging element 24 is provided on the transmitted light side of the light beam branching element 31 as shown in FIG. 4.

In addition, according to a second embodiment, which will be described later, when the imaging element 24 is provided on the reflected light side of the light beam branching element 31, it is preferable to satisfy T1<0.11 and R1>0.89.

Further, as for the coating performed on the light beam branching element 31, it is preferable to satisfy the above described conditions over the whole range of wavelengths used in the microscope 1, that is, a visible region. In addition, in a case in which even an ultraviolet (UV) wavelength region and an infrared (IR) wavelength range are used in the microscope 1, it is preferable that performance of the coating even in these wavelength regions satisfies the above described conditions.

In addition, as for the coating performed on the light beam branching element 31, it is preferable to satisfy the above described conditions over the whole angle of light beam which is made incident. For example, such as the microscope 1 according to the present embodiment shown in FIG. 4, when the light beam branching element 31 is installed to be inclined to the main light beam by 45°, it is preferable to satisfy the above described conditions in a range including an off-axis light beam with angle 45° as the center.

Further, using the front surface reflected light in the light beam branching element 31, effects due to a variety of plate thicknesses are able to be negligible. Thus, it is preferable that the front surface reflected light is guided to the imaging element 24 installed on the reflected light side or the phase difference optical system.

Figure 7:
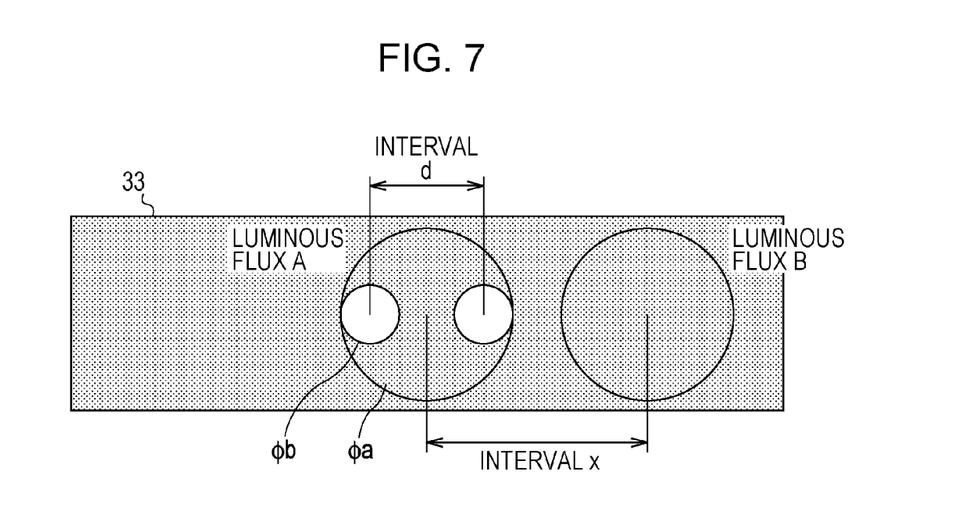
FIG. 7 is a diagram showing an example of a two eye lens filter according to a first embodiment.

Next, the thickness of the light beam branching element 31 will be further described in consideration of a relationship between the thickness of the light beam branching element 31 and the two eye lens filter 33 with reference to FIG. 7. FIG. 7 is a diagram showing an example of the two eye lens filter 33 according to the present embodiment.

As shown in FIG. 7, the two eye lens filter 33 according to the present embodiment is a diaphragm in which a set of through holes through which a luminous flux (luminous flux A in FIG. 7) being the phase difference image passes is provided. In the phase difference optical system according to the present embodiment, a luminous flux (luminous flux B in FIG. 7) corresponding to the ghosting light is separated from the luminous flux (luminous flux A) being the phase difference image by increasing the thickness t of the light beam branching element 31. When the luminous flux corresponding to the ghosting light does not pass through the through hole by separating the luminous flux corresponding to the ghosting light from the luminous flux being the phase difference image, it is possible to prevent the ghosting light from being imaged on the imaging element 35.

Here, as shown in FIG. 7, a luminous flux diameter of each of the luminous flux A and the luminous flux B in a position where the two eye lens filter 33 is provided is represented as $\phi a$, a diameter (that is, diameter of the diaphragm) of the through hole provided in the two eye lens filter 33 is represented as $\phi b$, and a center distance between the through holes is represented as d. When the optical system is adjusted in such a manner that a center of the luminous flux A is a center of the two eye lens filter 33, a separation distance x between the luminous flux A and the luminous flux B may satisfy a relationship shown in the following inequality 101 so that the luminous flux corresponding to the ghosting light does not pass through the through hole. In addition, a threshold value of the distance x calculated based on the following inequality 101 may be corrected to a larger value in consideration of defocus characteristics, and the like of the optical system.

$$x > \frac{(\phi a + \phi b + d)}{2} \quad \text{[Inequality 101]}$$

In addition, as described above, the separation distance x is compared with the thickness t of the light beam branching element 31, a proportional constant thereof is a unique one in the optical system. Accordingly, the thickness t of the light beam branching element 31 may be determined so as to satisfy a relationship shown in the following inequality 102. Here, in the following inequality 102, a coefficient k is an inverse number of the unique proportional constant in the optical system between the separation distance x and the thickness t of the light beam branching element 31.

$$t > k \times \frac{(\phi a + \phi b + d)}{2} \quad \text{[Inequality 102]}$$

As described above, in the defocus quantity detection unit 30 according to the present embodiment, the thickness t of the light beam branching element 31 is at least a predetermined threshold value, so that the ghosting light generated by the light beam branching element 31 may be sufficiently separated from the reflected light used in the process in the microscope 1. The separated ghosting light as described above is shielded by the two eye lens filter provided within the phase difference optical system, so that the separated ghosting light is not imaged on the imaging element 35 within the optical system. Thus, in the microscope 1 according to the present embodiment, it is possible to eliminate the ghosting light generated by the light beam branching element 31.

In addition, in the imaging element 24 provided on the transmitted side of the light beam branching element 31, it is possible to suppress effects due to the ghosting light to be not higher than the noise level of the imaging element 24 by adjusting the coating, and the like performed on the light beam branching element 31. Thus, even in the imaging element provided on the transmitted side of the light beam branching element 31, it is possible to eliminate the effects due to the ghosting light.

<Second Embodiment>

The microscope 1 according to the first embodiment installs the phase difference optical system on the reflected light side of the light beam branching element 31, and installs the imaging element 24 of the magnified image imaging unit 20 on the transmitted light side of the light beam branching element 31. In the microscope 1 according to a second embodiment, which will be described below, the phase difference optical system is installed on the transmitted light side of the light beam branching element 31, and the imaging element 24 of the magnified image imaging unit 20 is installed on the reflected light side of the light beam branching element 31.

In the microscope 1 according to the present embodiment, both the transmitted light and the reflected light branched by the light beam branching element 31 are used in the process in the microscope 1. The front surface reflected light is used with respect to the reflected light reflected from the light beam branching element 31, so that it is possible to suppress effects due to the plate thickness of the light beam branching element 31, however, the transmitted light transmitted through the light beam branching element 31 is influenced by the effects due to the plate thickness of the light beam branching element 31.

In addition, in order to branch the light beam transmitted through the sample, the light beam branching element 31 is installed to have an inclination with respect to the normal direction of the incident light beam, as shown in FIG. 1. Due to this, an amount of deviation of the light beam due to the image height is changed, so that there are possibilities that distortion, a chromatic aberration of magnification, a wavefront aberration, and the like are changed.

For example, it is assumed that the light beam transmitted through the condenser lens 23 is branched by the light beam branching element 31, and the branched light beam is detected in the imaging element 24 of the magnified image imaging unit 20 or the defocus quantity detection unit 30 (phase difference optical system). In this case, in the phase difference optical system, the light beam is detected in the two eye lens 34, and the light beam is injured in the diaphragm (two eye lens filter), so that a numerical aperture of an incident side (NA) becomes smaller than that in a case where the light beam is detected in the imaging element 24.

Figure 8:
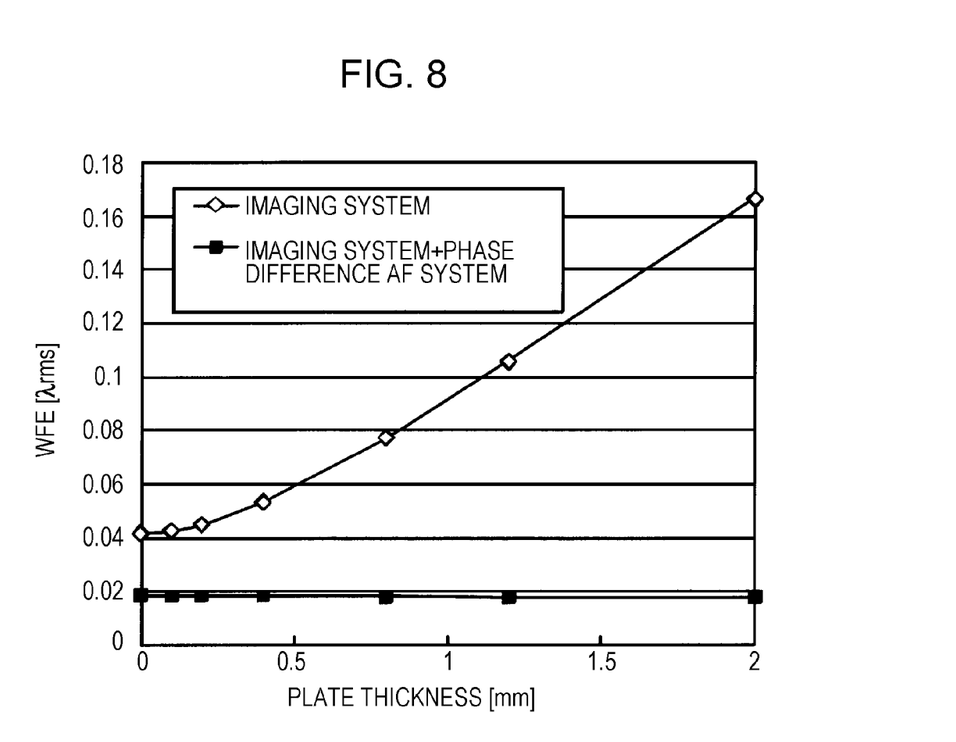
FIG. 8 is a graph showing a relationship between a wavefront aberration and a thickness of an optical branching element.

FIG. 8 is a graph showing a relationship between a size of a wavefront aberration (WFE) in light propagated in the imaging system (magnified image imaging unit 20) and light propagated in the imaging system and the phase difference optical system, and the plate thickness of the light beam branching element 31. As shown in FIG. 8, since the numerical aperture of the incident side becomes smaller, it is found that effects of the wavefront aberration due to the plate thickness is reduced in the phase difference optical system.

Figure 9:
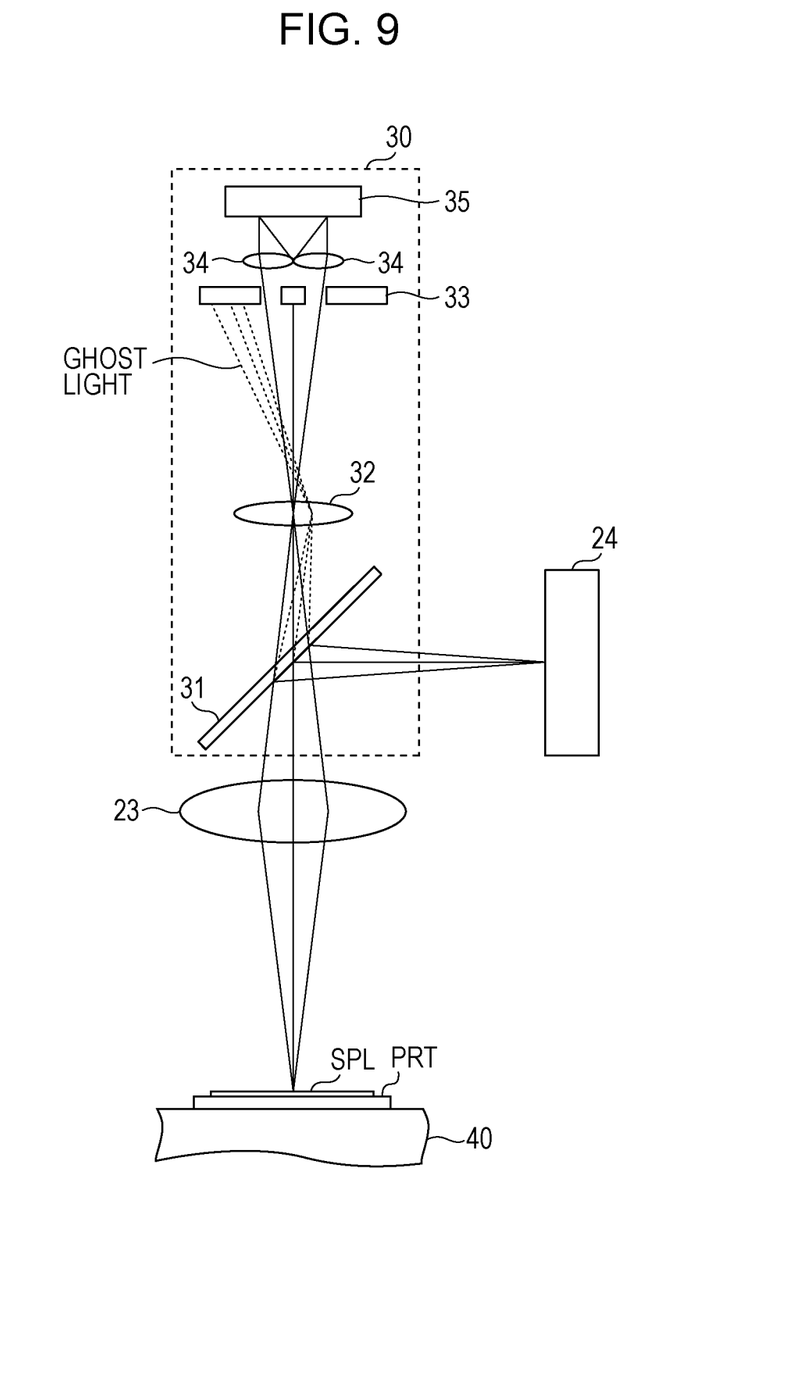
FIG. 9 is a schematic diagram showing an example of a defocus quantity detection unit according to a second embodiment.

Thus, as shown in FIG. 9, in the microscope 1 according to the present embodiment, the defocus quantity detection unit 30 (phase difference optical system) is installed on the transmitted light side of the light beam branching element 31, and the magnified image imaging unit 20 (that is, the imaging optical system) is installed on the reflected light side of the light beam branching element 31.

Since the imaging element 24 included in the magnified image imaging unit 20 is an imaging element used for precisely imaging the magnified image of the sample, the imaging element 24 is sensitive to the effects of aberration. Accordingly, the optical system of the magnified image imaging unit 20 is provided on the reflected light side of the light beam branching element 31, and only the front surface reflected light of the light beam branching element 31 is used, so that it is possible to eliminate the effects of aberration caused by the thickness of the light beam branching element. Further, when the magnified image imaging unit 20 is provided, it is preferable to reflect the sample transmitted light from the stage side of the light beam branching element 31.

In addition, there are possibilities that the transmitted light side of the light beam branching element 31 is influenced by the effects of aberration such as the distortion, the chromatic aberration of magnification, the wavefront aberration, and the like, however, the phase difference optical system is provided on the transmitted light side of the light beam branching element 31 to thereby reduce the effects due to aberration, as shown in FIG. 8.

Further, the light beam branching element 31 according to the present embodiment that is the same as that according to the first embodiment may be used, except that the front surface transmittance T1<0.11, and the front surface reflectance R1>0.89 are satisfied. The above described light beam branching element 31 is adopted, so that it is possible to eliminate the ghosting light, which is propagated in the phase difference optical system, using the two eye lens filter 33, and to suppress an intensity of the ghosting light imaged to the imaging element 24 so as not to affect the process of the imaging element 24.

In addition, the condenser lens 32, the two eye lens filter 33, the two eye lens 34, and the imaging element 35 according to the present embodiment, which are the same as those according to the first embodiment, may be used. Thus, the repeated description thereof will be herein omitted.

As described above, in the microscope 1 according to the present embodiment, the phase difference optical system is installed on the transmitted light side of the light beam branching element 31, and the imaging element 24 of the magnified image imaging unit 20 is installed on the reflected light side of the light beam branching element 31, so that it is possible to eliminate the ghosting caused by the light beam branching element, and to eliminate effects of various aberrations in the imaging element 24. As a result, it is possible to further improve accuracy of the microscope image imaged in the imaging element 24.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A microscope, comprising:
   an objective lens that receives light transmitted through a sample provided on a stage and converges the light;
   a first imaging optical system configured to image the convergent light; and
   a second imaging optical system configured to image a part of the convergent light branched from the first imaging optical system,
   wherein the second imaging optical system includes
      a light beam branching element that branches part of the convergent light that is still converging when it reaches the light beam branching element, and has a thickness of a predetermined threshold or more,
      an imaging element that images a phase difference image of the branched light,
      at least one optical element positioned to receive the convergent light from the light beam branching element, and to direct the light to the imaging element, where the convergent light is still converging when it reaches the at least one optical element, and
      a filter that shields a part of the branched sample transmitted light imaged on the imaging element,
   wherein the filter is a diaphragm in which a through hole set for allowing a luminous flux set which becomes the phase difference image to pass therethrough is provided, and
   wherein the thickness of the light beam branching element has a larger value than a feature value calculated based on a diameter of the through hole, a center distance between the through holes of the through hole set, and a luminous flux diameter at a position of the filter of the sample transmitted light.

2. The microscope according to claim 1, wherein the sample transmitted light reflected by the light beam branching element is imaged in the first imaging optical system, and
   the phase difference image of the sample transmitted light transmitted through the light beam branching element is imaged in the second imaging optical system.

3. The microscope according to claim 1, wherein the sample transmitted light transmitted through the light beam branching element is imaged in the first imaging optical system, and
   the phase difference image of the sample transmitted light reflected by the light beam branching element is imaged in the second imaging optical system.

4. The microscope according to claim 1, wherein the thickness of the light beam branching element has a larger value than a feature value calculated based on the following inequality $$t > k \times \frac{(\phi a + \phi b + d)}{2}$$

where t denotes a thickness of the light beam branching element, k denotes a specific constant in an optical system, $\phi a$ denotes a luminous flux diameter at a filter position of the sample transmitted light, $\phi b$ denotes a diameter of the through hole, and d denotes a center distance of through holes of the through hole set.

5. A ghosting elimination method, comprising:
   transmitting light through a sample provided on a stage to an objective lens that converges the light;
   branching, by a light beam branching element having a thickness of a predetermined threshold or more, a part of the convergent light that is still converging when it reaches the light beam branching element;
   receiving the convergent light from the light beam branching element with at least one optical element, where the convergent light is still converging when it reaches the at least one optical element; and
   shielding, of an imaging element for imaging a phase difference image of the branched light and a filter provided between the imaging element and the light beam branching element, ghosting light caused by a corresponding light beam branching element from the part of the light branched by the light beam branching element,
   wherein the filter is a diaphragm in which a through hole set for allowing a luminous flux set which becomes the phase difference image to pass therethrough is provided, and
   wherein the thickness of the light beam branching element has a larger value than a feature value calculated based on a diameter of the through hole, a center distance between the through holes of the through hole set, and a luminous flux diameter at a position of the filter of the sample transmitted light.

* * * * *